United States Patent [19]
Grayson

[11] 3,743,179
[45] July 3, 1973

[54] OVEN WITH AUTOMATIC COOK AND KEEP WARM MODE SELECTION

[75] Inventor: Richard Davis Grayson, Arcadia, Calif.

[73] Assignee: International Telephone and Telegraph Corporation, New York, N.Y.

[22] Filed: May 12, 1972

[21] Appl. No.: 252,719

[52] U.S. Cl.................... 236/15 A, 236/46, 236/99, 337/304
[51] Int. Cl............................................. F23n 5/06
[58] Field of Search............................ 236/46, 15 A

[56] References Cited
UNITED STATES PATENTS
3,281,074  10/1966  Solomon............................ 236/46
3,354,279  11/1967  Lamar............................ 219/493 X Primary Examiner—William E. Wayner
Attorney—C. Cornell Remsen, Jr. et al.

[57] ABSTRACT

A system for maintaining an oven at a selected cooking temperature and for reducing the oven temperature to keep the food warm after it has been cooked for a selected length of time. One or more thermostatic actuators perform the cook and keep warm functions through two respective switches which are rendered effective by a mechanically operable bistable switch. The bistable switch is moved to one position by a heat motor that is actuated momentarily by a timer. At least one thermostatic actuator has a knob to set the cooking temperature. When this knob is set to the OFF position, the bistable switch is automatically returned thereby to its other position.

3 Claims, 15 Drawing Figures

Patented July 3, 1973

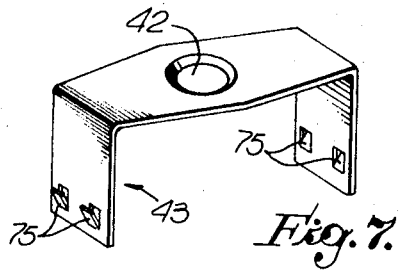
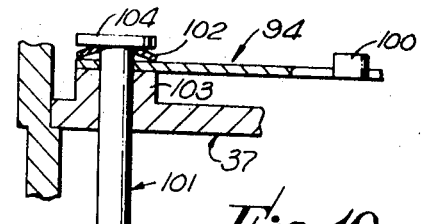
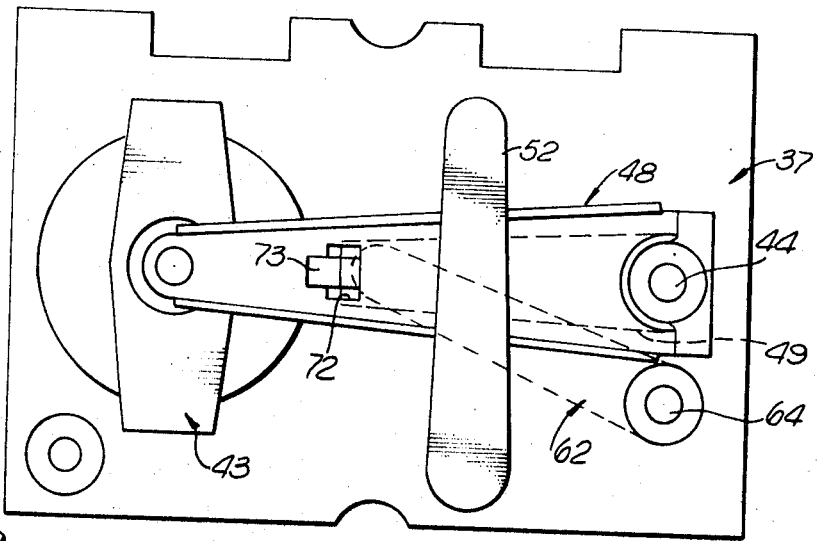
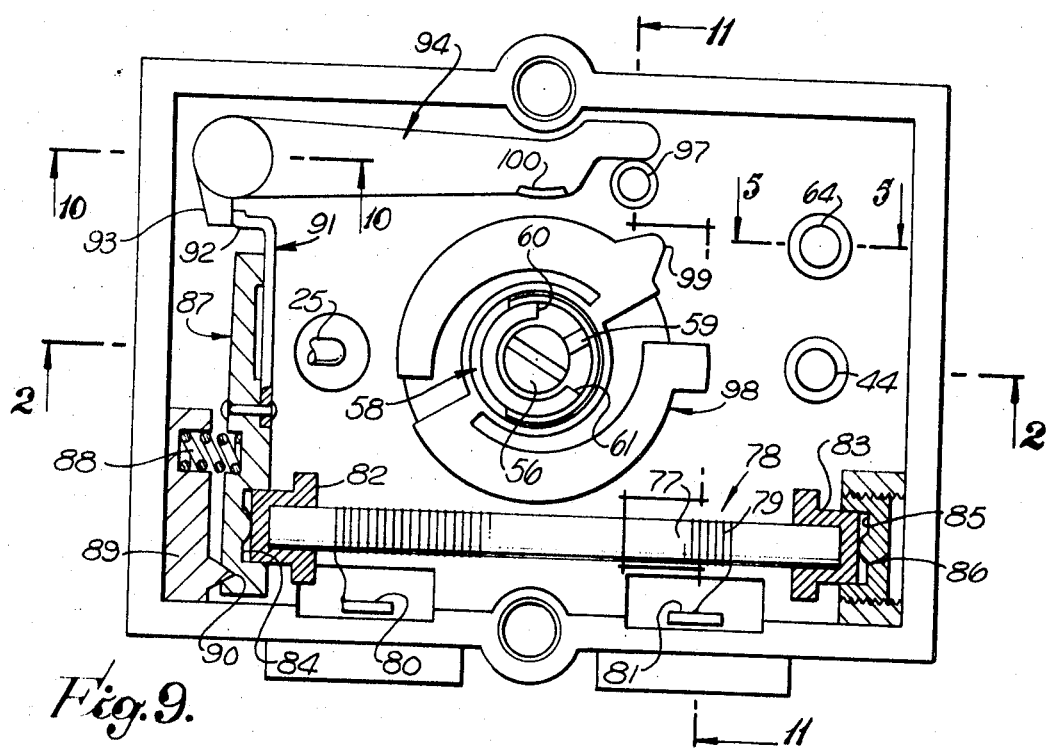

Patented July 3, 1973

OVEN WITH AUTOMATIC COOK AND KEEP WARM MODE SELECTION

BACKGROUND OF THE INVENTION

This invention relates to the cooking art, and more particularly, to a device which will cook food or the like at a selected higher temperature and, after a selected period of time, keep the food warm at a lower temperature.

In the past, it has been the practice to operate an oven main burner gas valve according to the setting of a manually adjustable thermostat control knob. The oven of a gas range is thus set to a cooking temperature by rotating the knob fixed to a shaft threaded through the thermostat housing. Frequently, the thermostat controls the valve through a lever fulcrumed on the knob shaft. In some cases, responsive to a timer output, the thermostat temperature setting is reduced to a keep warm temperature by changing the lever position. In other cases, responsive to a timer output, the thermostat temperature setting is reduced to the keep warm temperature by rotating the knob and shaft backwardly toward their OFF positions. For example, see U. S. Pat. Nos. 3,387,780; 3,304,001 and 3,341,119.

The prior art construction required in making the thermostat setting change unfortunately has been rather difficult, complicated and expensive to fabricate.

SUMMARY OF THE INVENTION

In accordance with the system of the present invention, the above-described and other disadvantages of the prior art are overcome by providing two separate electrical switches for cook and keep warm modes, respectively, and a mechanically operable bistable switch to select which one of the modes will be rendered effective.

Typically, timer means can, through a heat motor, throw the bistable switch to the stable keep warm position, and the bistable switch can be returned to the stable cook position responsive to the return of the thermostat knob to its OFF position.

It is, thus, an outstanding feature of the invention that both cook and keep warm modes are provided without the complicated structure required to reset the thermostat. (The thermostat is not reset.)

It is also an outstanding feature of the invention that the cook-keep warm mode selection is infallible from the consumer's point of view. After cooking, the oven will inevitably be turned off. When the oven is turned off, the cooking mode is automatically selected for the next time that the oven is used.

It is also a feature of the invention that the timer can be set either before or after the cooking temperature is set.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 7 is a perspective view of a spring employed to bias an expansible diaphragm shown in FIG. 2;

FIG. 8 is a top plan view of a plate shown in FIG. 2;

FIG. 9 is a bottom plan view of the plate shown in FIG. 2;

FIG. 10 is a vertical sectional view of a portion of a bistable switch taken on the line 10—10 shown in FIG. 9;

DESCRIPTION OF THE PREFERRED EMBODIMENTS

Figure 1:
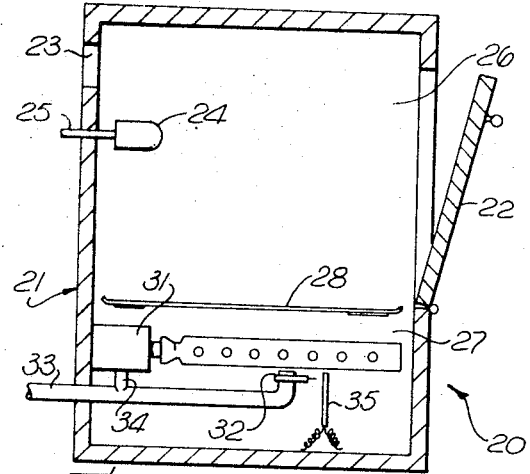
FIG. 1 is a vertical sectional view through a gas oven.

In the drawings, in FIG. 1, a conventional gas oven is indicated at 20 including a housing 21 having a door 22 and vent holes 23. A bulb 24 is fixed relative to housing 21 inside thereof. Bulb 24 contains a liquid which is thermally expansible, as is conventional. A hollow tube 25, also fixed relative to housing 21, carries the liquid from inside bulb 24 to a thermostat diaphragm, to be described.

The interior of housing 21 is divided into an upper compartment 26 and a lower compartment 27 by a partition 28 fixed to the sidewalls of housing 21, one of the sidewalls being indicated at 29.

In the lower compartment 27, a main burner 30 is connected from the outlet of a gas valve 31. A pilot burner 32 is connected from an inlet 33. Valve 31 has an inlet which is connected from inlet 33 by a conduit 34. A thermoelectric generator 35 is positioned adjacent pilot burner 32 in a position to be heated by gas emanating from pilot burner 32 and burning thereover.

As stated previously, all of the structures shown in FIG. 1 may be entirely conventional. For example, valve 31 may be a conventional solenoid valve which is normally spring biased closed.

In accordance with the present invention, a thermostat including bulb 24 and tube 25 is employed to turn valve 31 on and off to keep the interior of the housing 21 selectively either at a higher cooking temperature or at a lower keep warm temperature. Except for bulb 24 and tube 25, the said thermostat is indicated at 36 in FIG. 2 including a metal plate 37 fixed in a plastic case 38 having a cover 39 fixed thereto. A bellows or diaphragm assembly 40 is fixed through plate 37. Tube 25 connects it to bulb 24, shown in FIG. 1.

Figure 2:
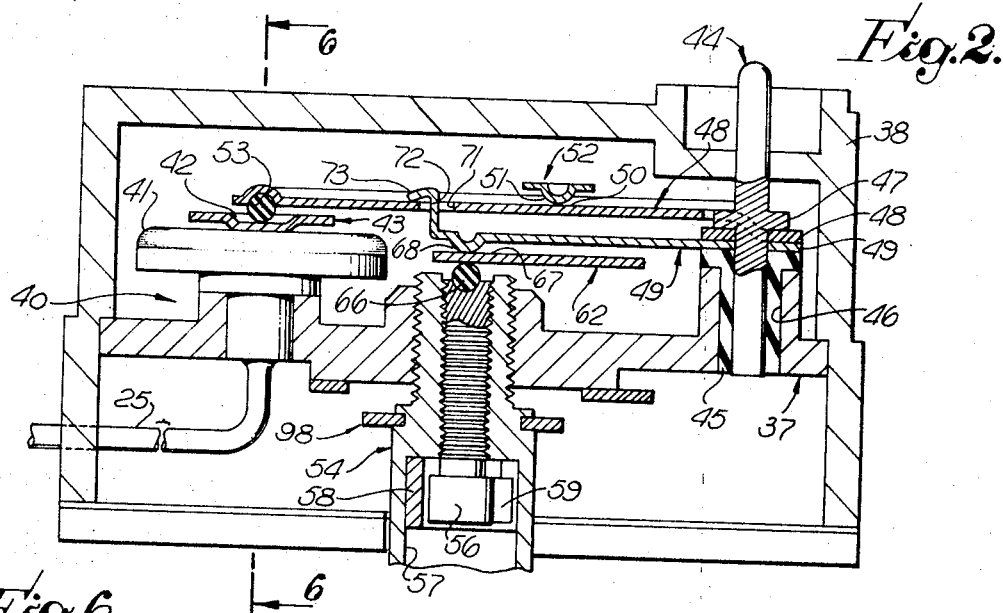
FIG. 2 is a vertical sectional view through a portion of a thermostat.

In FIG. 2, assembly 40 includes a diaphragm 41. A spring 43 biases diaphragm 41 downwardly, as viewed in FIG. 2, spring 43 having a depressed portion 42 to engage diaphragm 41.

Figure 3:
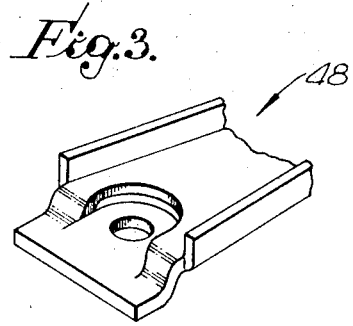
FIG. 3 is a perspective view of a portion of a cantilever leaf spring shown in FIG. 2.
Figure 4:
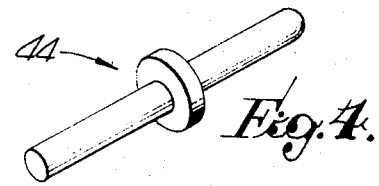
FIG. 4 is a perspective view of a pin shown in FIG. 2.

A pin 44 is press fit through a cylindrical insulator 45 in a bore 46 through plate 37. Pin 44 has a flange 47 which holds a cantilever leaf spring 48 in electrical contact with a cantilever leaf spring 49, leaf spring 49 bearing against insulator 45. Perspective views of spring 48 and pin 44 are shown in FIGS. 3 and 4, respectively. A portion 50 of leaf spring 48, and a portion 51 of a leaf spring 52 form electrical contacts which can engage and disengage each other. Leaf spring 52 is perhaps best shown in FIG. 11.

Leaf spring 48 is prestressed so as to always keep a spherical insulator 53 fixed thereto in pressure contact against spring depressio 42. A shaft 54 has one end 55 conventionally adapted to receive a knob to turn the thermostat to a selected cooking temperature. Shaft 54 is threaded through plate 37 and has a calibration screw 56 threaded therethrough. Shaft 54 has a hollow portion 57 therein in which a partial cylinder 58 is fixed. Screw 56 has a projection 59 thereon. Ends 60 and 61 of cylinder 58, thus, act as stops for calibration screw 56 limiting movement of projection 59. This is best shown in FIG. 9.

Figure 5:
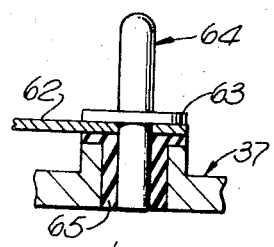
FIG. 5 is a sectional view of a portion of the structure around a pin taken on the line 5—5 shown in FIG. 9.

In FIG. 2, third cantilever leaf spring 62 is fixed between a flange 63 of a pin 64 and a cylindrical insulator 65, as shown in FIG. 5. The construction is thus, in part, similar to that shown in FIG. 2 immediately around pin 44.

As before, the free end of leaf spring 62 has a spherical insulator 66 fixed thereto to bear against the upper end of calibration screw 56, as viewed in FIG. 2. Spring 62 has a portion 67 which acts as an electrical contact which is engaged and disengaged by a portion 68 of leaf spring 49. Portion 68, thus, also acts as a switch contact.

Figure 11:
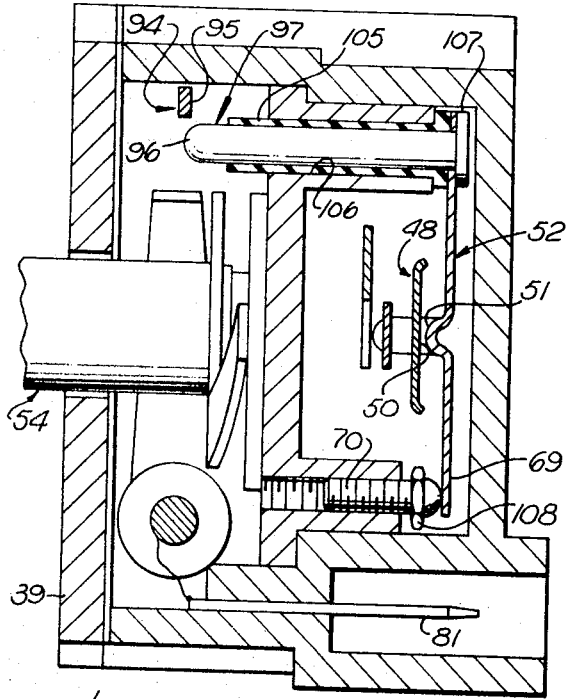
FIG. 11 is a vertical sectional view of the thermostat portion taken on the line 11—11 shown in FIG. 9.

As will be explained, when contacts 50 and 51 are not made as shown in FIG. 11, preferably the free end 69 of leaf spring 52 engages the right end of a calibration screw 70 threaded through plate 37. Leaf spring 52 is, thus, prestressed or located to accomplish this purpose. Preferably, contacts 50 and 51 make when the oven temperature is 170° F., although the invention is by no means limited to this temperature.

In FIG. 2, contacts 67 and 68 break when the oven temperature exceeds the thermostat set temperature. The thermostat set temperature is established by turning shaft 54 to a particular setting.

Note will be taken that leaf spring 48 faithfully follows diaphragm 41 regardless of whether or not contacts 50 and 51 or contacts 67 and 68 make or break.

If contacts 67 and 68 make, and diaphragm 41 falls to a lower position, as viewed in FIG. 2, leaf spring 48 can follow diaphragm 41 because leaf spring 48 has a slot 71 therethrough through which a projection 72 of leaf spring 49 extends. Thus, downward movement of leaf spring 48 is permitted with leaf spring 49 being stationary after contacts 67 and 68 have made.

Since leaf spring 49 is always prestressed or positioned to be spring biased so that portion 68 will lie in pressure contact with portion 67, if leaf spring 49 is lifted off of leaf spring 62 by engagement of leaf spring 48 with the end 73 of leaf spring 49, leaf spring 49 is only lifted off against the force of leaf spring 49.

Figure 6:
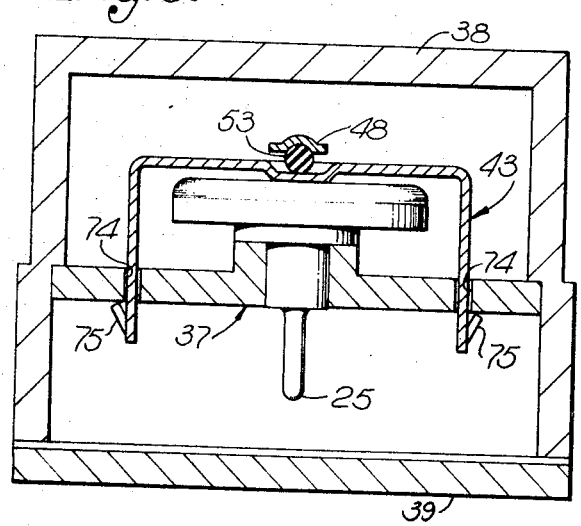
FIG. 6 is another vertical sectional view through the portion of the thermostat taken on the line 6—6 shown in FIG. 2.

As shown in FIG. 6, plate 37 has slots 74 therethrough through which the ends of spring 43 project. The ends of spring 43 have leaf spring tines 75 which snap in place on assembly.

In accordance with the present invention, a timer is used to cause the thermostat shown in FIG. 2 to stop cooking food at a higher temperature and to keep the food warm at a lower temperature. For example, it may be cooked at a temperature of 325° F., and kept warm at a temperature of 170° F. The keep warm temperature is established after a predetermined elapse of time. The reduction in oven temperature is accomplished by supplying electrical current to a heating coil 77 of a heat motor 78, shown in FIG. 9. The heat motor 78 also includes a thermally expansible rod 79. Rod 79 elongates when heated. Rod 79 is momentarily heated, e.g., for less than a minute. The timer supplies a heater voltage between identical conductor posts 80 and 81 connected to opposite ends of winding 77. Rod 79 has end caps 82 and 83 which are supported in recesses 84 and 85, respectively. Recess 85 is located in a fitting 86 threaded into base 37. Recess 84 is located in a lever 87 that is biased against end cap 82 by a coiled spring 88. A projection 89 integral with plate 37 carries spring 88 and a fulcrum 90 for lever 87. A leaf-type of overtravel spring 91 is fixed to lever 87. Spring 91 has an end 92 which engages a projection 93 fixed with an arm 94. Arm 94 has a portion 95 which can engage and disengage the end 96 of a pin 97 that rotatably supports leaf spring 52. Portions 95 and 96, thus, act as another pair of switch contacts which can make and break.

As shown in FIGS. 2 and 9, shaft 54 has a compression spring 98 that has a projection 99 thereon to engage a projection 100 on arm 94.

As shown in FIG. 10, a pin 101 is press fit through plate 37 to resiliently clamp one end of arm 94. This is done between a compression spring 102 and a boss 103 on plate 37. Spring 102 may be a Belleville spring or other conventional compression spring. Pin 101 has a flange 104 to hold spring 102 in compression against the left end of arm 94, as viewed in FIG. 10.

As shown in FIG. 11, pin 97 is press fit through a cylindrical insulator 105 that is located in a bore 106 through plate 37. Pin 97 has a flange 107 which holds leaf spring 52 securely in pressure contact with the right end of insulator 105, as viewed in FIG. 11.

Set screw 70 has a hemispherical insulator 108' fixed to the head 108 thereof, as viewed in FIG. 11, to keep the lower end of leaf spring 52 from coming into electrical contact with set screw 70 or its head 108 or plate 37.

Figure 12:
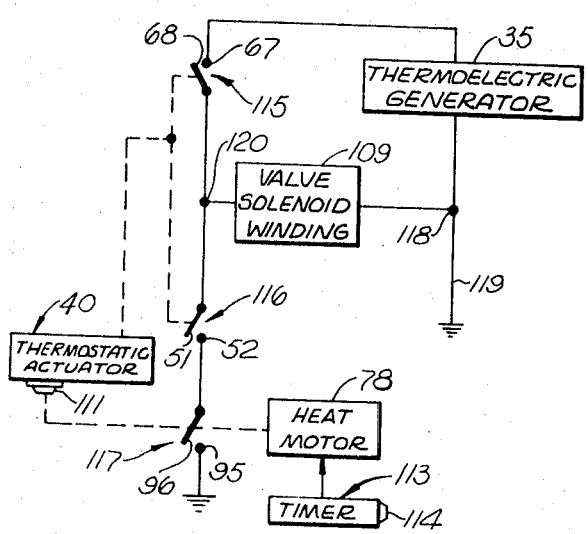
FIG. 12 is a block diagram of the system of the invention.

A block diagram of one embodiment of the present invention is shown in FIG. 12 including thermoelectric generator 35, the winding 109 of solenoid valve 31, a thermostatic actuator 40 having a cooking temperature setting knob 111, a heat motor 78, a timer 113 having an elapsed time setting knob 114 and switches 115, 116 and 117. Thermostatic actuator 40 may include all the structure shown in FIGS. 2-11, inclusive, with the exception that three pairs of switch contacts are shown separately. That is, switch 115 includes the contacts 67 and 68. Switch 116 includes the contacts 51 and 52. Switch 117 includes the contacts 95 and 96. However, thermostatic actuator 110 may also include bulb 24 and tube 25.

As shown in FIG. 12, one side of valve solenoid winding 109 and one side of thermoelectric generator 35 are connected together at a junction 118 which is grounded at 119. The other side of thermoelectric generator 35 is connected to ground through all three of the switches 115, 116 and 117. Switches 115 and 116 are connected together at a junction 120, which junction 120 is also connected to the other side of the valve solenoid winding 109.

Actuator 110 operates both of the switches 115 and 116. Switch 117 is closed when timer 113 operates heat motor 78. Switch 117 is opened when actuator knob 111 is turned to the OFF position. This is true because, as shown in FIG. 9, spring projection 99 engages arm projection 100 when shaft 54, fixed to knob 111, is turned to the OFF position.

Timer 113 may be any conventional timer which produces a switch closure or an output voltage for a short time after the elapse of a time set by rotation of knob 114. For example, heat motor 78 may be connected directly to the line voltage through a timer switch. Moreover, the timer, except for the commutator-type switch therein may be entirely mechanical, if desired. Rotation past the timer switch contacts will not interfere with proper operation because heat motor 78 will not be energized adequately until the full line voltage has been applied thereto for at least several seconds.

Figure 13:
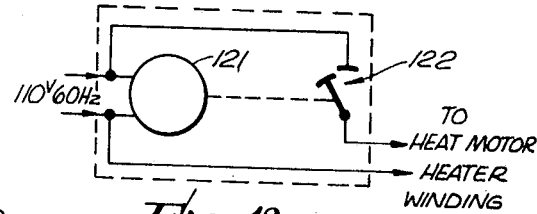
FIG. 13 is a schematic diagram of a conventional timer.

Alternately, timer 113 may be an electrical-type timer of the type just described and as shown in FIG. 13 including a synchronous motor 121 and a commutator-type switch 122.

OPERATION OF THE EMBODIMENT SHOWN IN FIG. 12

In the embodiment shown in FIG. 12, first assume that the oven is off. That is, knob 111 is turned to the OFF position, and the setting of timer knob 114 is to zero elapsed time. This means that switches 115, 116 and 117 are all open. Switch 115 is open because contacts 67 and 68 are parted by unscrewing shaft 54 to its OFF position. Switch 116 is open because the diaphragm 41 in FIG. 2 has lowered to its lowest position, and contacts 50 and 51 have been separated. Switch 117 is open because spring projection 99, in FIG. 9, is in engagement with arm projection 100. Contacts 95 and 96 are, thus, separated, as shown in FIG. 11.

It is a special advantage of the present invention that the system thereof may be practiced with or without the keep warm feature. If it is desired to use the invention without the keep warm feature, knob 111 of actuator 40 need only be set to the desired cooking temperature, and cooking will take place as though the invention had no keep warm feature. That is, when timer knob 114 is not set, the oven temperature is never removed to the keep warm temperature, e.g., 170° F.

If the timer knob 114 is not set for a selected elapsed time, turning knob 111 and shaft 54 will cause contacts 67 and 68 of switch 115 to make. The output voltage of thermoelectric generator 35 will then be impressed across valve solenoid winding 109. Valve 31 will then open, and the oven will heat to the set temperature. That is, the temperature corresponding to the setting of actuator knob 111. As is conventional, there is always some overshoot. For this reason, diaphragm 41 will cause contacts 67 and 68 to open at the set temperature. As the oven cools, switch 115 will again close and the cycle will be repeated. At any rate, the oven temperature will be kept at an approximately constant temperature equal to the set temperature.

Again, assume that all the switches 115, 116 and 117 are open and that the oven is off. This time, assume that the actuator knob 111 is set to the cooking temperature and the timer knob 114 is set to a selected cooking time. As before, the oven temperature will rise to the cooking temperature and be maintained there for the selected cooking time. At the end of the elapsed time selected for cooking, timer 113 will energize heat motor 78. Heat motor 78 will, in turn, close switch 117. This will then ground contact 52. As stated previously, screw 70 may be set, for example, to a keep warm temperature of 170° F. If so, contacts 50 and 51 of switch 116 always make when the oven temperature exceeds 170° F. Since the oven, when switch 117 was closed, was operating at the cooking temperature, which may be, for example, 325° F., switch 116 will then be closed. When switch 117 closes, valve solenoid winding 109 is, thus, short-circuited to ground through the switches 116 and 117. Moreover, thermoelectric generator 35 is also short-circuited to ground through switches 115, 116 and 117.

The short-circuiting of valve solenoid winding 109, of course, produces no undesirable affect other than to deenergize this winding. The short-circuiting of thermoelectric generator 35 likewise produces no undesirable affect.

The said short-circuiting turns off valve 31 until the temperature in the oven falls to or below 170° F. As stated previously, some small overshoot is permissible and inherent. Thus, if the oven falls slightly below 170° F., contacts 50 and 51 of switch 116 are open. However, the short circuit is broken by the opening of switch 116. Since the set temperature of actuator knob 111 has not been changed, switch 115 remains closed, and, again, the full output voltage of thermoelectric generator 35 is impressed across valve solenoid winding 109. The oven then begins to heat up to a temperature slightly above 170° F. As soon as this overshoot occurs, switch 116 will again close and short circuit valve solenoid winding 109 and thermoelectric generator 35. The temperature of the oven will, thus, modulate about the keep warm setting of 170° F. and at an approximately constant temperature of 170° F. until the actuator knob 111 is turned to the OFF position. When actuator knob 111 is finally returned to the OFF position, spring projection 99 engages arm projection 100 and arm 94 is moved to separate the contacts 95 and 96 of switch 117, as shown in FIG. 11. Note will be taken that heat motor 78 is only energized for a short period of time, and will normally be cool by the time spring projection 99 returns arm 94 to its OFF position by engagement with arm projection 100.

It is important to note that the switch, including contacts 95 and 96, is a bistable switch. Spring 102, shown in FIG. 10, always causes arm 94 to remain in the position it is moved to either by heat motor 78 or by the engagement of spring projection 99 with arm projection 100.

THE ALTERNATIVE EMBODIMENT OF FIGS. 14 AND 15

Figure 14:
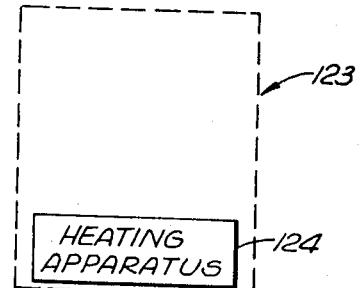
FIG. 14 is a diagrammatic view of an oven.

Notwithstanding the fact that the present invention has exceptional utility when used in connection with the operation of gas ovens for gas ranges, it is also applicable to any type of an oven. An oven 123 is shown in FIG. 14 having heating apparatus 124 fixed relative thereto therein. Heating apparatus 124 may either include gas valve 31 or the electric heating element of an electric oven.

Figure 15:
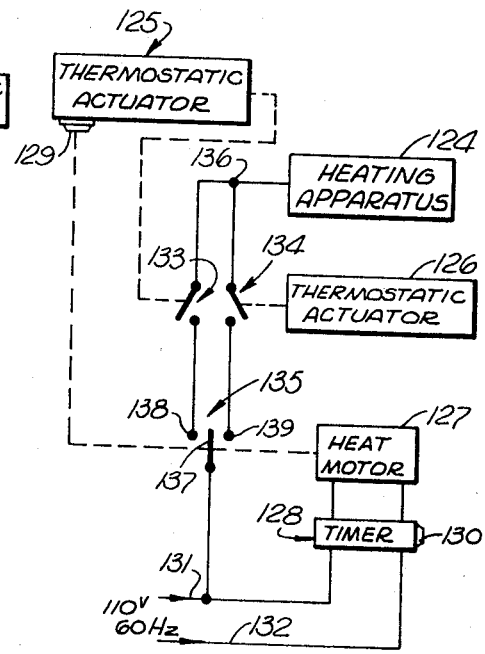
FIG. 15 is a block diagram of an alternative embodiment of the present invention.

In FIG. 15, an alternative embodiment is shown including heating apparatus 124, a thermostatic actuator 125, a thermostatic actuator 126, a heat motor 127 and a timer 128. Actuator 125 has a cooking temperature setting knob 129. Timer 128 has an elapsed time setting knob 130. 110 volts, 60 hertz is provided on input leads 131 and 132. Switches are provided at 133, 134 and 135. Timer 128 is connected across the line. Heat motor 127 is connected from timer 128. Switch 135 is a single-pole, double-throw switch which is placed in its right hand position when heat motor 127 is energized. Switch 135 is pressed in its left hand position when knob 129 is turned to its OFF position. Actuator 125 may be entirely conventional to set cooking temperature. However, the connection of knob 129 with switch 135 is new. Actuator 126 may be entirely conventional. The same is ture of switches 133 and 134, but only when used individually. Heating apparatus 124 is connected from lead 132 to a junction 136. Switch 135 has a pole 137 and contacts 138 and 139. Switch 133 is connected from junction 136 to contact 138. Switch 134 is connected from junction 136 to contact 139. Pole 137 is connected to input lead 131.

OPERATION OF THE EMBODIMENT SHOWN IN FIG. 15

In the operation of the embodiment shown in FIG. 15, again, cooking may be performed without utilizing the keep warm feature. This is done, as before, by not turning timer knob 130 to a selected elapsed time. In this case, switch pole 137 will always engage contact 138, and actuator 125 will open and close switch 133 to keep the oven at the temperature set by knob 129. Keep warm startup is the same.

In order to utilize the keep warm feature, after knob 129 is set to the cooking temperature, the timer knob 130 is turned to the selected elapsed time. After cooking for the elapsed time, timer 128 will energize heat motor 127 momentarily to move switch pole 137 in engagement with contact 139 (again, switch 135 is a bistable switch). Separaton of pole 137 from contact 138 takes switch 133 out of the circuit. Engagement of pole 137 with contact 139 places switch 134 in the circuit. Actuator 126 is constructed to maintain switch 134 closed when the oven temperature is below 170° F. and to keep switch 134 open when the oven temperature is above 170° F. Actuator 126, thus, operates switch 134 to keep the oven at an approximately constant temperature of 170° F. This continues until actuator knob 129 is turned to its OFF position. In this case, arm 137 engages contact 138 and disengages contact 139 to take switch 134 out of the circuit. Further, turning actuator knob 129 to the OFF position causes switch 133 to remain open since the OFF position represents room temperature or the like.

DEFINITIONS

Note will be taken that although the embodiment of FIG. 12 relies upon the short-circuiting of the valve solenoid winding 109 and/or the short-circuiting of thermoelectric generator 35, the embodiment of FIG. 15 does not rely upon any short-circuiting. The present invention is, therefore, not limited to any short-circuiting.

In FIG. 12, thermostatic actuator 40 operates both switches 115 and 116. In FIG. 15, thermostatic actuators 125 and 126 operate switches 133 and 134, respectively. Thus, in accordance with the present invention, either a single actuator such as actuator 40 or two separate actuators 125 and 126 may be used. The invention is, therefore, not limited to either a single actuator or to two actuators.

In both of the embodiments of FIGS. 12 and 15, switches 117 and 135 are both mechanically operable bistable switches.

As stated previously, the present invention is not limited to practice on a gas range. It also may be practiced on an elctric range.

Although, as shown connected in FIG. 12, the short circuit made by switches 116 and 117 is across valve solenoid winding 109. Alternatively, the short circuit, including switches 116 and 117, may be connected directly across thermoelectric generator 35.

The phrase "bistable switch" is hereby defined for use herein and in the claims to include, but not be limited to, a relay having self-locking contacts.

The embodiment of FIG. 15 may be practiced by the use of a single thermostatic actuator, if desired. Such a single actuator would replace actuators 125 and 126 and operate both of the switches 133 and 134.

The phrase "bistable switch" is hereby defined for use herein and in the claims to include a switch actuable to first and second different positions and a switch which will remain in either one of the said first and second positions until it is actuated to the other position.

Although gating means, including a flip-flop, might be thought of as a bistable switch and such gating means may incorporate a single actuating means, the phrase "bistable switch" is hereby defined for use herein and in the claims to include, but not be limited, to, first and second different means for actuating a switch to said first and second positions thereof, respectively. Further, said gating means may actuate a switch within a very short period of time. However, the phrase "bistable switch" is hereby defined for use herein and in the claims to include, but not be limited to, a switch which is or can be actuated within a rather long period of time.

What is claimed is:

1. An oven comprising: a housing; heating apparatus including an electric circuit component fixed relative to said housing to cause the production of heat inside said housing when a source of potential is connected across said component; first and second switches actuatable to operate said oven at first and second temperatures, respectively, said first temperature being a cooking temperature, said second temperature being a keep warm temperature; first means fixed relative to said housing inside thereof to produce an output according to the temperature inside said housing; second means connected to receive said first means output for opening and closing said first and second switches to maintain the temperature inside said housing at one of said first and second temperatures, respectively; selectively operable third means including a mechanically operated bistable switch to render only one of said first and second switches effective at a time to operate said oven at said first and second temperatures, respectively, said component being connected to said bistable switch, said bistable switch having first and second stable positions, said third means including forth means momentarily actuable to move said bistable switch to said first position, said second means including a manually adjustable, movable knob, said cooking temperature being set according to the position of said knob; and means responsive to movement of said knob to an OFF position to move said bistable switch to said second position thereof, said second means causing said oven to be maintained at said first temperature when said bistable switch is in said second position, said second means causing said oven to be maintained at said second temperature when said bistable switch is in said first position.

2. An oven comprising: a housing, a main burner fixed relative to said housing inside thereof; a pilot burner to receive a combustible fuel fixed relative to said housing inside thereof adjacent said main burner; a solenoid valve having solenoid winding means, said valve being fixed relative to said housing, said valve having an inlet for connection from a source of a combustible fuel and an outlet connected to said main burner; thermoelectric generator means fixed relative to said housing inside thereof adjacent said pilot burner to be heated by burning fuel emanating therefrom; a first switch, each of said means and said first switch being connected in a closed loop series circuit; second and third switches connected in series in a circuit connected in parallel with one of said means, said second and third switches, when both closed, short-circuiting said one means; thermostatic actuator apparatus connected to said first and second switches, said actuator being adapted to maintain the interior of said housing at an approximately constant cooking temperature when said third switch is open by cyclically opening and closing said first switch, actuator apparatus maintaining the interior of said housing at an approximately constant keep warm temperature by cyclically opening and closing said second switch when said third switch is closed, said third switch being a mechanically operable bistable switch having open and closed stable positions; settable timer means to actuate said third switch momentarily to its closed position, said actuator apparauts having a manually adjustable movable knob to set said cooking temperature; and a device responsive to movement of said knob to an OFF position to move said bistable switch to said open position thereof.

3. An oven comprising: a housing; apparatus responsive to an applied voltage to cause the interior of said housing to be heated; first and second single-pole, single-throw switches; a third single-pole, double-throw switch having first and second contacts, said first switch being connected from one side of said apparatus to said first contact, said second switch being connected from said one apparatus side to said second contact; first and second power input leads connected to said third switch pole and the other apparatus side, respectively, said third switch being a mechanically operable bistable switch having a first stable position with the pole thereof in engagement with said first contact and a second stable position with the pole thereof in engagement with said second contact; thermostatic actuator means to open and to close said first and second switches cyclically to maintain the interior of said housing at cooking and keep warm temperatures, respectively, when said third switch is in said first and second positions, respectively, said actuator means including a manually adjustable movable knob to set said cooking temperature; momentarily actuating timer means to move said bistable switch pole to said second position thereof after an adjustable time lapse; and means responsive to movement of said knob to an OFF position to move said bistable switch pole to said first position thereof.

* * * * *